Oct. 1, 1963 P. ONNO ETAL 3,105,939

PRECISION TIME DELAY GENERATOR

Filed July 21, 1960 2 Sheets-Sheet 2

United States Patent Office

3,105,939

Patented Oct. 1, 1963

3,105,939

PRECISION TIME DELAY GENERATOR

Peter Onno, Montreal, Quebec, and John F. Haberl, Pierrefonds, Quebec, Canada, assignors to Canadian Marconi Company, Montreal, Quebec, Canada Filed July 21, 1960, Ser. No. 44,444
Claims priority, application Canada Sept. 15, 1959
5 Claims. (Cl. 328—34)

This invention is concerned with electronic time measurement and is directed at providing improved circuitry for the generation of precise time delays.

In the time domain between the fractional microsecond range for which delay lines are well adapted, and the multisecond range for which clock systems are used, it has been the general practice to make use of a linearly rising (or falling) wave of voltage or current to develop or measure time delays. The wave is initiated at the beginning of the time interval and is fed to one input of an amplitude comparing system. To the comparing system is fed a predetermined reference potential. When the amplitude of the linearly rising wave reaches that of the reference potential the amplitude comparator produces a response.

Where adjustable delays are required which are a direct function of, say, a potentiometer setting, the precision of such a system is dependent upon the linearity of the rising waveform and the precision of the reference potential, and to achieve a high degree of precision requires considerable complexity in the circuits used. Whereas highly precise vacuum tube circuits have been developed at the cost of such complexity, it has been found that versions of such systems using transistors are not satisfactory due to the inherent characteristics of transistors, and it has been very difficult to design a transistorized precision time delay generator.

It is an aim of the present invention to provide a precision time delay generating system which is not dependent upon the use of a linearly rising waveform.

It is also an aim of the present invention to provide an adjustable precision time delay generating system which does not require the provision of a precise reference potential.

It is a further aim of the present invention to provide a precision time delay generator whose mode of action is such that it may employ semi-conductor devices in place of vacuum tubes without degradation in performance.

According to the invention there is provided a time delay circuit comprising, in combination, a resistance capacity network having first and second terminals and constituted of a first branch comprising a first resistance of value $R_1$ and a first capacitance of value $C_1$ serially connected in that order between said first and second terminals, a second branch comprising a second capacitance of value $C_2$ and a second resistance of value $R_2$ serially connected in that order between said first and second terminals, a third resistance of value $R_3$ connected in parallel with $C_2$, the values $C_2$, $R_2$ and $R_3$ being such as to satisfy the relations $C_2R_2=2R_1C_1$, and $R_3=3R_2$; a voltage comparator having first and second inputs; means connecting the first input of said voltage comparator between said second terminal and the junction of said first resistance and said first capacitance; means connecting the second input of said voltage comparator between said second terminal and a point on said second resistance; a low impedance waveform generator providing a voltage wave having a stepped wavefront followed by a substantially flat portion; means to apply the output of said generator between said first and second terminals; and utilization means fed from said voltage comparator.

The invention will be described and explained with reference to the accompanying drawings in which.

Figure 1:
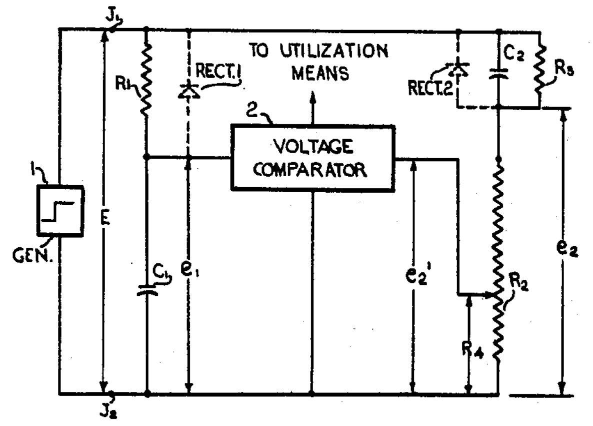
FIGURE 1 shows the basic circuitry of the invention.

Referring to FIGURE 1, a generator 1, of a step function wave of amplitude E is connected to apply this wave across terminals $J_1$, $J_2$, of a resistance capacity network having two branches, a resistance $R_1$ and a capacitance $C_1$ serially connected between $J_1$ and $J_2$, and a capacitance $C_2$ paralleled with a resistance $R_3$ serially connected with a resistance $R_2$ also between $J_1$ and $J_2$. A voltage comparator 2, is fed with potentials derived from the junction of $R_1$ and $C_1$ and from a point on resistance $R_2$. The output of the voltage comparator 2, is applied to such utilization means as is desired.

Many types of voltage comparators suitable for use in the invention are known, a number of which are described in the book "waveforms" by Chance et al., volume 19 of the Radiation Laboratories series. Of these it might be noted that the "multiar," described on page 343 of the noted publication, may readily be transistorized, and may for that reason be preferred to some other types for use with the present invention. However, the only required characteristics of a voltage comparator for use with the present invention are those common to most comparator applications, namely, that it should have sufficient sensitivity and that it should not load the circuits feeding it.

The generator 1, of the step function wave acts as a switch which switches the potential applied between the terminals $J_1$ and $J_2$ from a first to a second level. For a true step function the generator 1, must of course have a low internal impedance, but so long as this requirement is fulfilled the particular form of generator 1, is only a matter of choice.

The rectifiers Rect. 1 and/or Rect. 2, shown in broken lines, may be used, if desired, to discharge $C_1$ and/or $C_2$ respectively at the end of the step wave of voltage and thus re-set the system for the application of another step wave.

The action of the system of FIGURE 1 may be explained with reference to FIGURE 2. Assuming that both $C_1$ and $C_2$ are initially discharged, upon the application at time $t_0$ of the step function of value E to the terminals $J_1$, $J_2$, the capacitance $C_1$ will start to charge up exponentially toward the value E as indicated by the curve $e_1$. Also at the time $t_0$ the voltage E appears across $R_2$, but as $C_2$ charges up, the voltage $e_2$ across $R_2$ falls exponentially toward the value $$\frac{R_2}{R_2+R_3}$$

Figure 2:
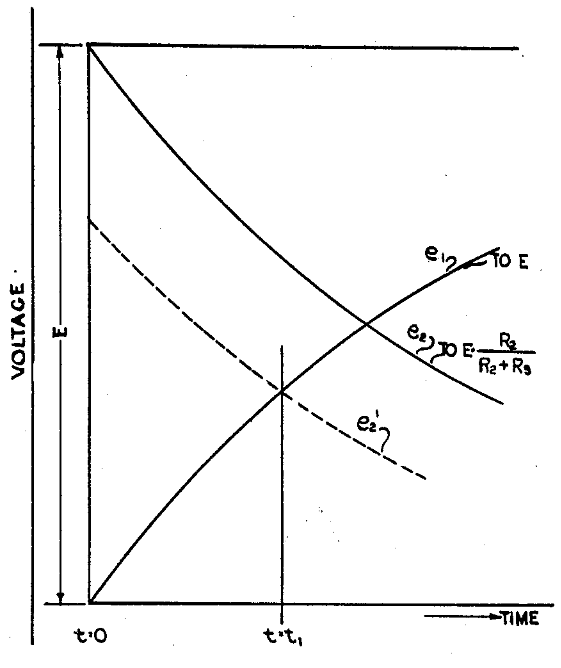
FIGURE 2 is a graph of waveforms in the circuit of FIGURE 1.

As will be seen from FIGURES 1 and 2, a potential $e_2'$ can be picked up from $R_2$ which crosses the potential $e_1$, at the time $t_1$ which time is dependent upon the value selected for $R_4$. When $e_1$ equals $e_2'$ the voltage comparator 2, to which these potentials are applied, produces a response.

What is desired of the system is to make $t_1$ a linear function of the value selected for $R_4$. How this is done will be shown by the following mathematical analysis.

Let $T_1=R_1C_1$ $$T=\frac{R_2R_3}{R_2+R_3}\cdot C_2$$

and $t_1 \ll T_1$ and $T_2$

Then $$\frac{e_1}{E}=1-E^{-t/T_1}=t/T_1\{1-\tfrac{1}{2}(t/T_1)+\tfrac{1}{6}(t/T_1)^2\ .\ .\ .\ \}\quad (1)$$

and $$\frac{e_2{}^1}{E}=R_4/R_2\left\{1-\frac{R_3}{R_2+R_3}(1-e^{-t/T_2})\right\}$$

$$=R_4/R_2\left\{1-\frac{R_3}{R_2+R_3}[t/T_2-\tfrac{1}{2}(t/T_2)^2+\ .\ .\ .\ ]\right\}\quad (2)$$

Now, at time $t=t_1$ when $e_1=e_2{}^1$, the value $t_1/T_1$ can be made to equal $R_4/R_2$—that is $t_1=T_1\cdot R_4/R_2$, a linear function of the ratio $R_4/R_2$—if the corresponding terms within the brackets of the Equations 1 and 2 for $e_1/E$ and $e_2/E$ are each made equal. For the stipulated condition that $t_1 \ll T_1$ or $T_2$, this condition will hold to a high order of accuracy if $$\tfrac{1}{2}\cdot t_1/T_1=\frac{R_3}{R_2+R_3}t_1/T_2\quad (3)$$

and $$\tfrac{1}{6}\cdot(t_1/T_1)^2=\tfrac{1}{2}\cdot\frac{R_3}{R_2+R_3}\cdot(t_1/T_2)^2\quad (4)$$

from which $$R_2C_2=2R_1C_1\quad (5)$$

and $$R_3=3R_2\quad (6)$$

Thus, if the circuit is made to fulfill the requirements of Equations 5 and 6, the occurrence of the response from the comparator will vary linearly with the setting of $R_4$. This linearity will still hold even if the effective step voltage acting in the two time constant branches are different. If these effective voltages are $E_1$ and $E_2$, the value of $t_1=E_2/E_1\cdot R_4/R_2\cdot T_1=\text{constant}\times R_4/R_2$. The pertinency of this fact will appear from the discussion in respect to the embodiment shown in FIGURE 3 to be set forth later.

The invention has a number of advantages in practice. Analysis shows that for a linearity of 0.1% in $t_1$ versus $R_4/R_2$, Equation 5 must hold to 0.3%. $C_1$ and $C_2$ may be a pair of nominally identical capacitors, and thus have the same nominal value and matching temperature and other coefficients subject to changes in environmental conditions, the required equality in (5) being made with precision by fine adjustment of $R_1$ or $R_2$ or both.

The conditions of Equation 6 for the abovenoted linearity need be met to only with 5%, a requirement which is relatively easy to fulfill.

It is important to note from the foregoing analysis that the length of the desired period is independent of the absolute value of the applied step voltage E.

Figure 3:
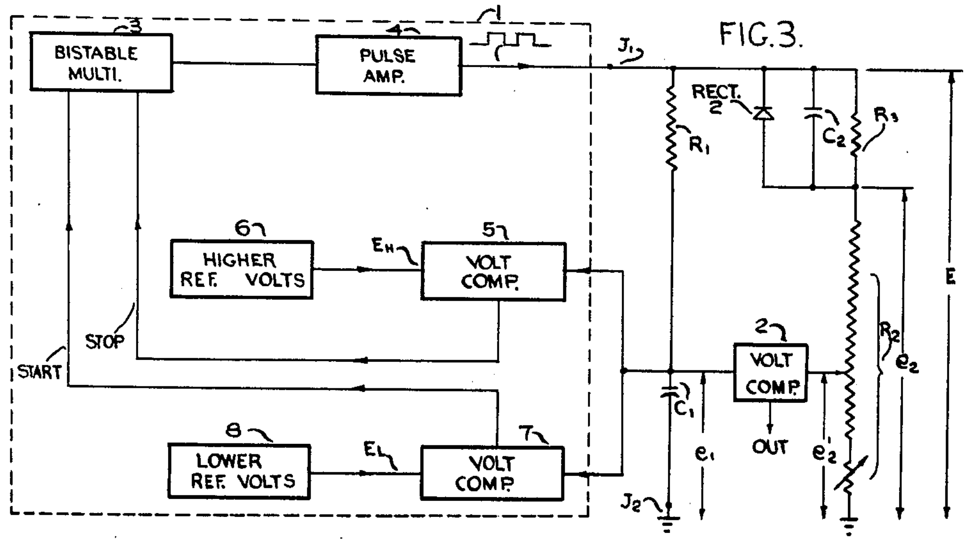
FIGURE 3 shows an adjustable time divider using the circuit of FIGURE 1.

In FIGURE 3 is shown the use of the invention as a precision time divider. In some computing or timing systems it is often required to provide a timing interval which is a selectable proportion of a given fixed interval. This function is performed by the system of FIGURE 3. The step function generator 1, of FIGURE 1 operates in FIGURE 3, as will be described, to produce a repetitive series of step functions or, in other words, a rectangular wave which is shown in FIGURE 3 being applied to terminal $J_1$. The resistance capacity network of FIGURE 3 corresponds essentially to that of FIGURE 1 using the rectifier Rect. 2, but with an adjustable resistor as shown included in $R_2$ to act as a trimmer to establish the conditions of the foregoing Equations 5 and 6.

The generator 1, comprises a bistable multivibrator 3, whose output is squared or flattened by a pulse amplifier 4, and fed to the network terminal $J_1$. The multivibrator 3, is turned off by a pulse from the voltage comparator 5, which responds when the potential $e_1$ across $C_1$ rises to the value $E_H$ of 6, the higher of two reference voltage sources 6 and 8. The multivibrator is turned on by a pulse from the voltage comparator 7, which responds when the potential across $C_1$ falls to the value $E_L$ of 8, the lower of the two reference voltage sources.

Figure 4:
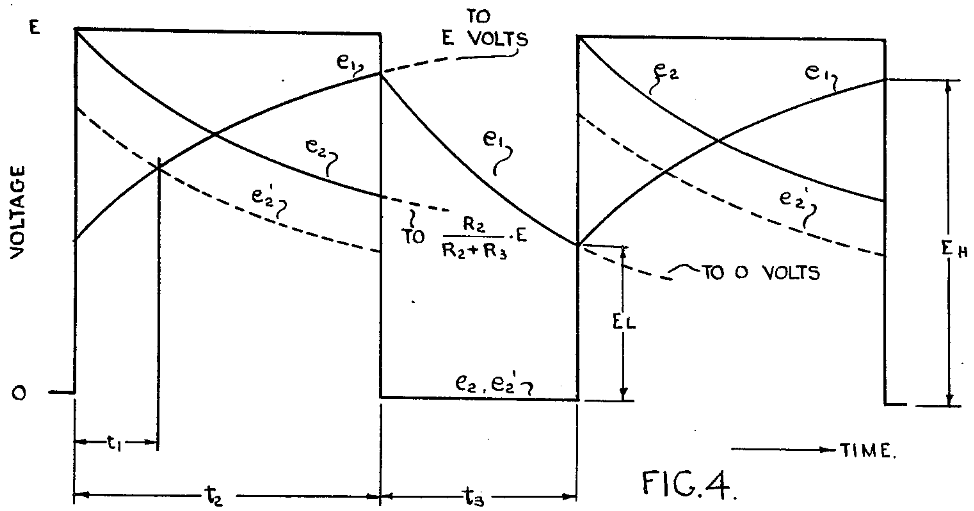
FIGURE 4 shows waveforms of the circuit of FIGURE 3.

The action of the system will be seen from the graphical presentation of FIGURE 4. At the time $t_2$, the potential across $C_1$, which has been rising toward the step function voltage E, reaches the value $E_H$ of the reference 6. The comparator 5, responds, stopping the multivibrator 3 whereby the input to the network is cut off. The potential $e_1$ then starts to fall toward zero volts. After the interval $t_3$ the potential $e_1$ reaches the value $E_L$ whereupon comparator 7, responds, starting the multivibrator 3 and initiating another cycle of action.

At the time $t_2$ the potential $e_2$ across $R_2$, which has been falling towards the value $$\frac{R_2}{R_2+R_3}\cdot E$$

is abruptly brought to zero by the action of the rectifier across $C_2$. In this embodiment, with operating times and time constants such as to produce waveforms as shown, it will be seen that the voltage actually operative in the branch $R_1C_1$ is no longer E, as for FIGURE 1, but $E-E_L$. Thus, $t_1$, instead of being given by $t_1=R_4/R_2\cdot T_1$ becomes $$t_1=\frac{E}{R-E_L}\cdot R_4/R_2\cdot T_1$$

It should be noted that the rectifier, Rect. 2, across $C_2$ may be omitted without changing the linear relationship between $t_1$ and $R_4/R_2$. If such is done, however, the action is more complex, new variables are introduced, and the degree of precision reduced. If the rectifier is omitted the potential of $e_2$ at time $t_2$ will fall by E volts to a negative value, and then start rising towards zero volts. At time $t_3$ the potential $e_2$ will be raised by E volts but, in the case illustrated, will not reach the potential E but will be less since $C_2$ will not have been fully discharged. Hence the actual acting voltage in the $C_2R_2R_3$ circuit will be a function of $t_2$ and $t_3$ which now are themselves functions of $E_H$ and $E_L$ and the time constants $T_1$ and $T_2$. It is considered desirable, therefore, to provide means such as, say, a crystal diode to discharge $C_2$ at the point $t_2$ of the operating cycle.

The reason for terming this arrangement a time divider will be seen when it is realized that both $t_1$ and $t_2$ are functions of the same time constant $T_1$. Thus the ratio of $t_1$ to $t_2$ is largely unaffected by changes in $T_1$ such as might be caused by changes in environmental conditions.

It is also evident that the switching or timing of the generator 1, may be effected by applying potentials to the voltage comparators 5 and 7 from other points in the circuit than those shown. For example, if rectifier Rect. 1 across $R_1$ were used instead of rectifier Rect. 2, and the voltage comparators 5 and 7 fed from the junction of $C_2$ and $R_2$, the timing sequence would be dependent on $T_2$ instead of $T_1$. Or, in this case, comparators 5 and 7 could be fed with the potential $e_2{}^1$ whereby the timing would be a function of the adjustment of the tap on $R_2$. It should be noted, however, that as distinguished from the potentials $e_1$, $e_2$ and $e_2{}^1$ are comprised of both exponential and step function waveforms so that the comparators 5 and 7 should be made unresponsive to abrupt voltage changes.

It will be apparent to those skilled in the art that the basic invention illustrated by FIGURE 1 is capable of many applications in the domain of timing measurements and the generation of precise time delays. The embodiment shown and discussed in respect to FIGURE 3 illustrates one practical application of the invention and a number of the factors to be considered when using the invention. However, the scope of the invention is not to be judged only from the embodiments set forth above but should be assessed from the following claims.

The embodiments of the invention in which an exclusive property or privilege is claimed are defined as follows:

1. A time delay circuit comprising, in combination, a resistance capacity network having first and second terminals and constituted of a first branch comprising a first resistance of value $R_1$ and a first capacitance of value $C_1$ serially connected in that order between said first and second terminals, a second branch comprising a second capacitance of value $C_2$ and a second resistance of value $R_2$ serially connected in that order between said first and second terminals, a third resistance of value $R_3$ connected in parallel with $C_2$, the values $C_2$, $R_2$ and $R_3$ being such as to satisfy the relations $C_2R_2=2R_1C_1$, and $R_3=3R_2$; a voltage comparator having first and second inputs; means connecting the first input of said voltage comparator between said second terminal and the junction of said first resistance and said first capacitance; means connecting the second input of said voltage comparator between said second terminal and a point on said second resistance; a low impedance waveform generator providing a voltage wave having a stepped wavefront followed by a substantially flat portion; means to apply the output of said generator between said first and second terminals; and utilization means fed from said voltage comparator.

2. A time delay circuit as claimed in claim 1 wherein said means connecting said second input of said voltage comparator to a point on said second resistance comprises an adjustable tap on said second resistance.

3. A time delay circuit as claimed in claim 1 wherein the output from said waveform generator is repetitive and wherein there is provided means to discharge at least one of said first and second capacitance at the termination of each output wave delivered by said generator.

4. A time delay circuit as claimed in claim 1 wherein switching means are provided to switch said generator on and off, wherein there is provided in one of said branches of said network, a rectifier so connected as to discharge the capacitance in said one branch at the termination of a wave delivered by said generator, and wherein the potential developed at a point in the other of said branches is applied to control said switching means.

5. A time delay circuit as claimed in claim 1 wherein there is provided across said second capacitance a unilaterally conductive device so poled as to discharge said second capacitance upon the termination of a wave delivered by said generator, wherein said means connecting said second input of said voltage comparator to a point on said second resistance comprises an adjustable tap on said second resistance, and wherein said waveform generator comprises in combination a bistable multivibrator, a pulse amplifier fed from said multivibrator and in turn delivering the output from said generator to the input terminals of said resistance network, a high level voltage comparator having first and second inputs and an output, a source of a higher level reference potential feeding the first input of said high level voltage comparator, means to apply the potential developed across said first capacitance to the second input of said high level voltage comparator, means to feed the output of said high level voltage comparator as a stop signal to said bistable multivibrator, a low level voltage comparator having first and second inputs and an output, a source of lower level reference potential feeding the first input of said low level voltage comparator, means to apply the voltage developed across said first capacitance to a second input of said low level voltage comparator, and means to feed the output of said low level voltage comparator as a start signal to said bistable multivibrator.

No references cited.